US008356224B2

(12) United States Patent
Kaburaki et al.

(10) Patent No.: US 8,356,224 B2
(45) Date of Patent: Jan. 15, 2013

(54) COMMUNICATION METHOD AND SYSTEM USING TWO OR MORE CODING SCHEMES

(75) Inventors: Satoshi Kaburaki, Tokyo (JP); Masahiro Sekiya, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 12/776,463

(22) Filed: May 10, 2010

(65) Prior Publication Data

US 2010/0223529 A1 Sep. 2, 2010

Related U.S. Application Data

(63) Continuation of application No. 11/498,753, filed on Aug. 4, 2006, now Pat. No. 7,734,987.

(30) Foreign Application Priority Data

Aug. 4, 2005 (JP) ................................. 2005-226753

(51) Int. Cl.
 *H04L 1/18* (2006.01)
(52) U.S. Cl. ...................... 714/748; 714/755; 714/784
(58) Field of Classification Search .................. 714/748, 714/749, 751, 755, 774, 784
See application file for complete search history.

(56) References Cited

U.S. PATENT DOCUMENTS

| 5,828,677 | A | 10/1998 | Sayeed et al. |
| 7,174,493 | B2 | 2/2007 | Matsumoto et al. |
| 7,500,166 | B2 | 3/2009 | Miyazaki et al. |
| 7,502,330 | B2 | 3/2009 | Nabetani et al. |
| 7,539,928 | B2 * | 5/2009 | Rhee et al. ..................... 714/784 |
| 7,817,552 | B2 * | 10/2010 | Miyake et al. ................ 370/235 |
| 2002/0196812 | A1 | 12/2002 | Yamaguchi et al. |
| 2009/0319878 | A1 | 12/2009 | Kaburaki |

FOREIGN PATENT DOCUMENTS

| JP | 55-137742 | 10/1980 |
| JP | 2000-188609 | 7/2000 |
| JP | 2003-198511 | 7/2003 |
| JP | 2004-80576 | 3/2004 |
| JP | 2005-72878 | 3/2005 |
| JP | 2008-167081 | 7/2008 |
| WO | WO 2004/093374 A1 | 10/2004 |

OTHER PUBLICATIONS

Sunghyun Choi, et al., "A Class of Adaptive Hybrid ARQ Schemes for Wireless Links", IEEE Transactions on Vehicular Technology, vol. 50, No. 3, May 31, 2001, pp. 777-790.

(Continued)

*Primary Examiner* — Fritz Alphonse
(74) *Attorney, Agent, or Firm* — Oblon, Spivak, McClelland, Maier & Neustadt, L.L.P.

(57) ABSTRACT

A communication method includes causing a transmitter to apply error correcting or detecting code systems to multiple frames or packets and to transmit the multiple frames or packets in succession, causing a receiver to receive the transmitted frames or packets and to decode each of the frames or packets received, and causing the receiver to send an acknowledgment signal to the transmitter on the basis of the results of decoding of the frames or packets. The transmitter applies two or more error correcting or detecting code systems to the frames or packets.

4 Claims, 13 Drawing Sheets

OTHER PUBLICATIONS

Daji Qiao, et al., "A two-step adaptive error recovery scheme for video transmission over wireless networks", INFOCOM 2000, Nineteenth Annual Joint Conference of the IEEE Computer and Communications Societies. Proceedings. IEEE, vol. 3, Aug. 6, 2002, pp. 1698-1704 (plus cover page).

Krishna Balachandran, et al., "GPRS-136: High-Rate Packet Data Service for North American TDMA Digital Cellular Systems", IEEE Personal Communications, vol. 6, No. 3, Aug. 6, 2002, pp. 34-47 (plus cover page).

Chen et al., Multi-stages hybrid ARQ with conditional frame skipping and reference frame selecting scheme for real-time video transport over wireless LAN. Feb. 2004, IEEE Trans. on Consumer Elect., vol. 50, No. 1, p. 158 to 167.

Yi et al., Hybrid ARQ scheme using interleaved Reed Solomon codes in a power controlled Dc-CDMA cellular system, Nov. 1996, IEEE Trans. on Vehicular Tech., vol. 45, No. 4, p. 683-687.

\* cited by examiner

COMMUNICATION METHOD AND SYSTEM USING TWO OR MORE CODING SCHEMES

CROSS-REFERENCE TO RELATED APPLICATIONS

This application is a continuation of U.S. Ser. No. 11/498,753 filed Aug. 4, 2006, which claims priority under 35 U.S.C. 119 to Japanese Patent Application No. 2005-226753, filed Aug. 4, 2005, the entire contents of both of which are incorporated herein by reference.

BACKGROUND OF THE INVENTION

1. Field of the Invention

The present invention relates to a communication method and system. For example, the present invention relates to an error correcting method and device for use with burst transmission in which data frames are successively transmitted in the field of communication.

2. Description of the Related Art

In burst communication, communication data are transmitted successively in the form of frames or packets. Hereinafter, the frame or packet is referred to as a frame. In burst communication, a frame may not arrive at a receiver (this is called nonarrival) or an error or errors may occur in data during transmission. To detect or recover nonarrival or errors, therefore, an error detecting or error correcting code can be used. To notify the transmitting end of the nonarrival or the occurrence of errors, the receiver can return an acknowledgment (ACK) to the sender.

The acknowledgment is made as follows: The sender sends a frame and the receiver then receives the frame and checks its contents. At this point, when an error detecting or error correcting code has been applied, it is decoded to determine whether the received frame is error-free. The receiver then sends an ACK (acknowledgment) frame to the sender. In the event of nonarrival or an error, the receiver sends no ACK frame. If the sender does not receive the ACK frame within a specified period of time after transmission of the frame, the sender retransmits the frame again. This process is called retransmission.

If, when a large amount of data is to be transmitted, an acknowledgment is made for each frame, the time required to make acknowledgments will require a large percentage of the overall transmitting/receiving time, resulting in reduced communication efficiency. There also exists a communication system in which a plurality of frames is acknowledged collectively. For example, the wireless LAN standard 802.11e specifies block acknowledgment. The block acknowledgment system involves transmitting multiple frames in succession (this transmission is referred to as a burst transmission) and acknowledging the received frames in a block. Specifically, the transmitter sends four frames, for example, in succession and then sends a block ACK request frame BAReq. The receiver requested to make acknowledgment sends a block ACK frame BA according to error conditions of the successively received frames.

The receiver decodes the error detecting and/or error correcting codes applied in advance to the frames and then acknowledges each of the frames according to the decoding results. If, at this point, no error is detected or errors, if detected, can be corrected, an ACK frame is sent; otherwise, no acknowledgment is made. There is also a communication system in which, to notify the sender of nonarrival or an error, the receiver sends to the transmitter a frame to the effect that the data has an error or the error cannot be corrected as an alternative to making no acknowledgment.

Some error correcting and/or error detecting codes require a long decoding time. When an error correcting or error detecting code has been applied to the block ACK system, the receiver decodes the code to determine error conditions. After that, the receiver sends a block ACK (BA) frame. In this case, the receiver must send the BA frame within a set period of time after receipt of the last frame. That is, the receiver must finish decoding the error correcting or error detecting code within that set period of time. It is therefore difficult to apply to the block ACK system an error correcting or error detecting code the decoding of which cannot be completed within the set period of time to the block ACK system.

In recent years, real-time contents, such as video and audio, are often transmitted over a communication link. In the event that some of the transmitted frames do not arrive or errors which cannot be corrected with an error correcting code are present, a problem arises in that the contents cannot be normally reproduced at proper times.

Japanese Patent Application Publication (KOKAI) No. 2004-80576 discloses a system which switches the modulation modes according to the position of PDU (Protocol Data Unit) within a frame.

BRIEF SUMMARY OF THE INVENTION

A communication method according to an aspect of the present invention includes:
  causing a transmitter to apply two or more error correcting or detecting code systems to multiple frames or packets and to transmit the multiple frames or packets in succession;
  causing a receiver to receive the transmitted frames or packets and to decode each of the frames or packets received; and
  causing the receiver to send an acknowledgment signal to the transmitter on the basis of the results of decoding of the frames or packets.

A communication system according to an aspect of the present invention includes:
  a transmitter which applies two or more error correcting or detecting code systems to multiple frames or packets and transmits the multiple frames or packets in succession; and
  a receiver which receives the transmitted frames or packets, which decodes each of the frames or packets, and which sends an acknowledgment (ACK) signal to the transmitter on the basis of results of decoding of the frames or packets.

DETAILED DESCRIPTION OF THE INVENTION

First Embodiment

A communication method and system according to a first embodiment of the present invention will be described. This embodiment uses a communication method adapted to perform block acknowledgment after successive transmission (burst transmission) of multiple frames or packets. In this case, decoding of an error detecting code or error correcting code requires some time. The maximum time required varies according to the coding scheme used. With this point in mind, in the first embodiment, two or mode different coding systems are selectively applied to frames or packets to be burst transmitted in the communication method adapted to acknowledge the frames or packets as a unit. That is, frames or packets to which different coding systems have been applied are mingled within a burst transmission period. This embodiment will be described hereinafter by way of an example of selectively applying two coding systems (first and second coding schemes) to frames.

Figure 1:
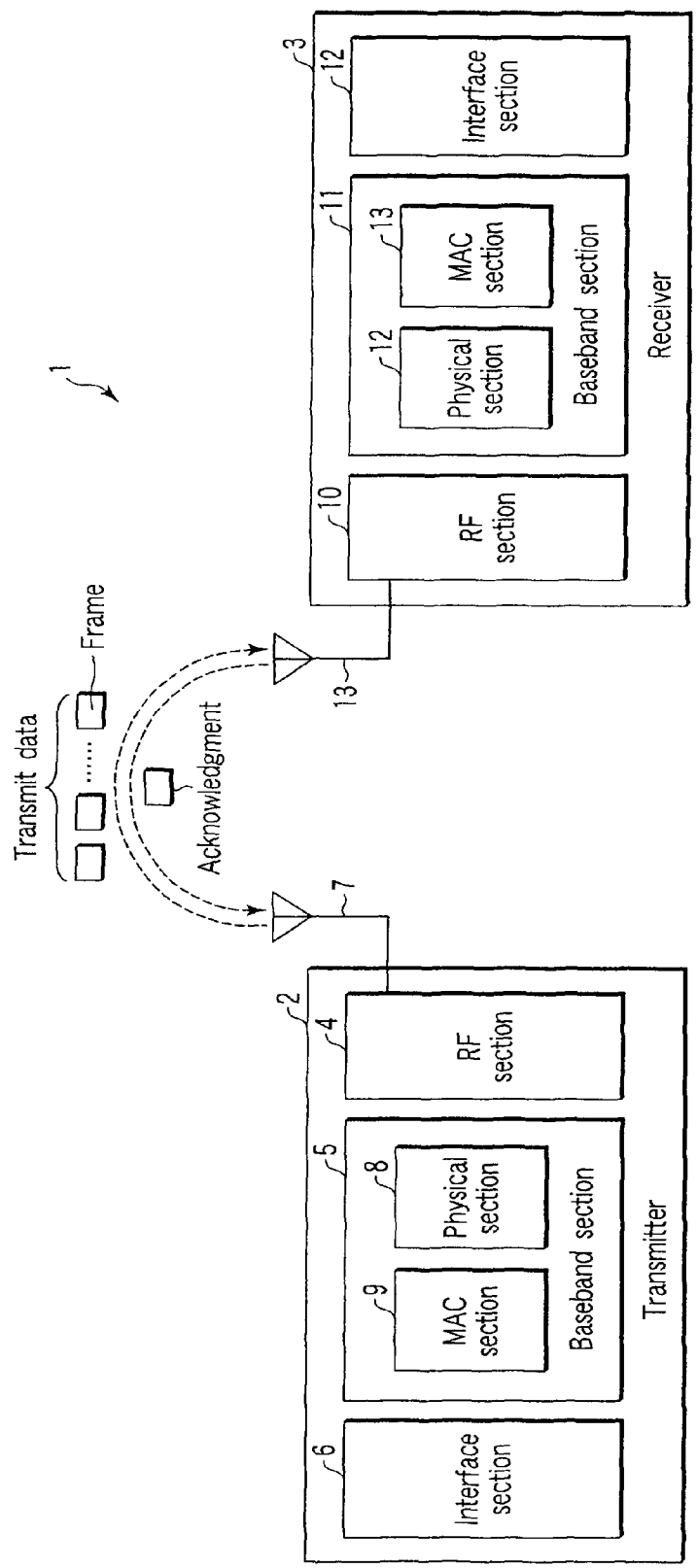
FIG. 1 is a schematic block diagram of a communication system according to a first embodiment of the present invention.

FIG. 1 is a schematic block diagram of a wireless communication system as an example of a communication system according to this embodiment. As shown, the wireless communication system 1 includes a transmitter 2 and a receiver 3, which form a communication network (LAN). The transmitter 2 is connected through a wire LAN to, for example, a server, a DVD (Digital Versatile Disc) player, and an HDD (Hard Disk Drive), which are not shown, or connected via an internet service provider to the Internet through the use of a metal line or optical fiber. Data is sent to the receiver 3 through wireless communication. At this point, the transmitter 2 burst transmits a sequence of frames. Upon receipt of these frames, the receiver 3 sends a block ACK frame to the transmitter 2.

The transmitter 2 includes a radio frequency (RF) section 4, a baseband section 5, and an interface section 6. The RF section 4 amplifies analog data transmitted or received via radio communication and transmits or receives data through an antenna 7. The interface section 6 receives transmit data from the server, DVD, HDD, or the Internet. The baseband section 5 performs signal processing on transmit data received by the interface section 6 and then outputs it to the RF section 4 or processes an ACK frame received by the RF section. The baseband section 5 includes a physical section 8 and a MAC (Media Access Control) section 9. In the description which follows, transmit/receive data on the receiver 3 side with the MAC section 9 as the boundary are called frames, whereas transmit/receive data on the interface section 6 side are called packets. The packet is transmit/receive data structured so that it can be handled by personal computers. The frame is transmit/receive data structured so that it can be communicated by radio.

The MAC section 9 receives a packet from the interface section 6, then adds a header to the packet to form a frame and outputs that frame to the physical section 8.

The physical section 8 performs transmission/reception processing associated with the physical layer of a frame to be communicated. Specifically, for a transmission frame, the physical section performs orthogonal frequency division multiplexing (OFDM) modulation on a frame from the MAC section 9 to obtain a baseband transmit signal and provides digital-to-analog conversion of the baseband transmit signal to obtain an analog signal. For a received ACK frame, the physical section performs the opposite processes; that is, the physical section converts a received analog signal into digital form and then performs OFDM demodulation and error correction decoding on the resulting digital signal to obtain a frame.

Figure 2:
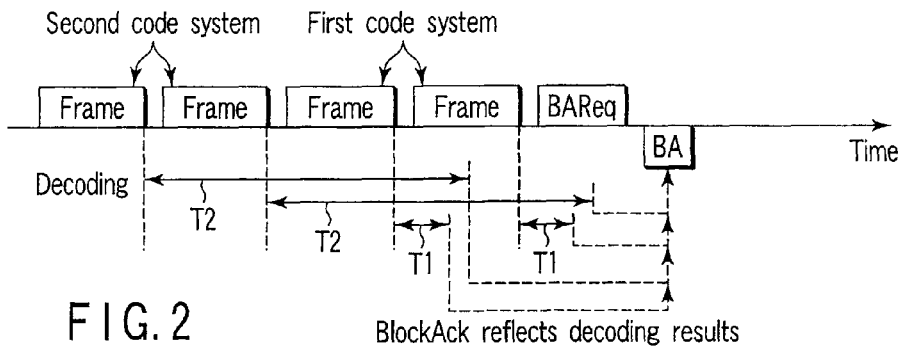
FIG. 2 is a conceptual diagram of a frame transmission in the communication method of the first embodiment.

FIG. 2 is a conceptual diagram of burst transmission of frames or packets in accordance with the communication method of the first embodiment. In this embodiment, as specified by the wireless LAN standard 802.11e, multiple frames or packets are transmitted successively and these frames are acknowledged at a time (block acknowledgment). In FIG. 2, frames or packets sent from the data originating equipment (sender) are shown on the horizontal axis (time axis) and a frame or packet sent from the data terminating equipment (receiver) is shown on the underside.

In the example of FIG. 2, the sender sends four frames in succession and then sends a block acknowledge request BAReq. The receiver sends a block ACK frame BA to the transmitter according to error conditions of the successively received frames.

Figure 3:
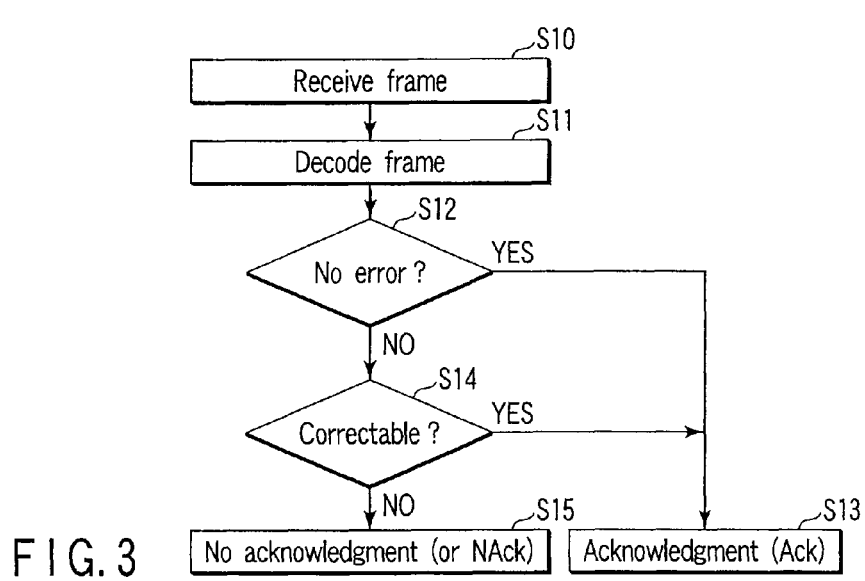
FIG. 3 is a flowchart illustrating the communication method of the first embodiment.

The receiver decodes error control codes or error correcting codes applied to frames or packets, then applies such an algorithm as shown in FIG. 3 to each frame or packet according the results of decoding and acknowledges the received frames or packets in a block. FIG. 3 is a flowchart for the processing by the receiver, particularly the processing of whether to perform acknowledgment or not.

As shown, the receiver receives a frames (step S10) and then decodes that frames (step S11). When no error is detected in the received frames as the result of the processing in step S11 (YES in step S12), the receiver returns an acknowledgment to the sender (step S13). That is, the receiver sends to the sender a frame to the effect that the frame was received correctly. If the decision in step S12 is that the frame is in error (NO in step S12), then a decision is made as to whether or not the error is correctable (step S14). If correctable (YES in step S14), the procedure goes to step S13. If not correctable (NO in step S14), the receiver returns no acknowledgment to the sender or sends a frame Nack (negative acknowledgment) indicating that the frame was not received correctly (step S15).

The frames to which coding systems have been applied contain information data and parity. The information data is net data the user sends or receives. The parity is data that is generated by an error control or error correcting code system and used in subsequent error detection or correction.

The maximum time required to decode the parity, the parity and its reliability may vary from frame to frame or may be the same for all the frames. For the coding system, systematic codes may be used in which original information before encoding appears in part of information after encoding. Alternatively, non-systematic codes may be used.

It does not matter whether the first and second coding systems are each an error detecting or error correcting code system; however, it is desirable that the second coding system be higher in reliability than the first coding system. For example, an CRC (cyclic redundancy check) error detecting code can be used as the first coding system and an error correcting code, such as an RS (Reed-Solomon) code or LDPC (Low Density Parity Check) code, can be used as the second coding system. The parity of a frame to which the second coding system has been applied is larger in amount of data than the parity of a frame to which the first coding system has been applied. In addition, the maximum time T2 required to decode a frame to which the second coding system has been applied is longer than the maximum decoding time T1 for a frame to which the first coding system has been applied. In general, the higher the reliability of the coding system, the longer the decoding time becomes.

Consider now that the maximum decoding time for the first coding system is shorter than the interval between the time that the last one of the frames to be sent in sequence is received and the time to return acknowledgment, and the maximum decoding time for the first and second coding systems is shorter than the interval between the time that the first frame is received and the time to return acknowledgment.

In this case, as shown in FIG. 2, some leading frames in a burst transmission use the second coding system. In the example of FIG. 2, the first two frames use the second coding system. A long time T2 is required to decode the coding system applied to each of these frames. However, decoding can be completed while the succeeding frames are received. Therefore, the results of decoding of these leading frames can be reflected in the ACK frame BA.

In contrast, the first coding system is applied to some trailing frames in the burst transmission. In the example of FIG. 2, the first coding system is applied to the last two frames. The decoding time T1 for the coding system applied to each of these frames is relatively short (shorter than for the second coding system). Therefore, the results of decoding of these trailing frames can also be reflected in the ACK frame BA.

In the communication method according to the first embodiment of the present invention, as described above, a transmitter selectively applies two or more error correcting or error detecting code systems to multiple frames or packets and sends these frames or packets in succession. A receiver decodes each of the frames or packets received from the transmitter and returns to the transmitter an acknowledgment based on the results of decoding of the received frames or packets. In this case, in burst communication in which multiple frames are acknowledged collectively, a coding system which requires a long decoding time is applied to leading frames and a coding system is applied to trailing frames which requires a short decoding time and allows decoding to be completed by the time to return an acknowledgment. Thereby, the results of decoding of all the frames can be reflected in the ACK frame BA.

Although two coding systems are adopted in the above example, three or more coding systems may be used. The number of frames to which each coding system is applied may be determined in advance by both the sender and the receiver. Alternatively, the numbers of frames to which first through n-th coding systems (n is a natural number of 2 or more) are respectively applied may be determined using percentages (coefficients) $\alpha 1, \alpha 2, \alpha 3, \ldots \alpha n$ ($0<\alpha 1, \alpha 2, \alpha 3, \ldots \alpha n<1$). In this case, the number of frames to which each coding system is applied is determined by finding an integer Mi that satisfies $Mi \leq \alpha i \times N$ or $\alpha i \times N \leq Mi$ ($i=1, 2, 3, \ldots$, N and N is the total number of frames). Any other method may be used. This method will be described later in detail with reference to FIG. 15.

Although the embodiment has been described in terms of an example of returning acknowledgment after receipt of a block acknowledge request BAReq. However, if the receiver knows about the number of frames to be burst transmitted, it may return acknowledgment even if the sender does not send a block acknowledge request BAReq. Even in this case, if a coding system is applied to trailing frames which allows decoding to be completed by the time to return an ACK frame BA, the same advantages will be obtained.

Modification of First Embodiment

Figure 4:
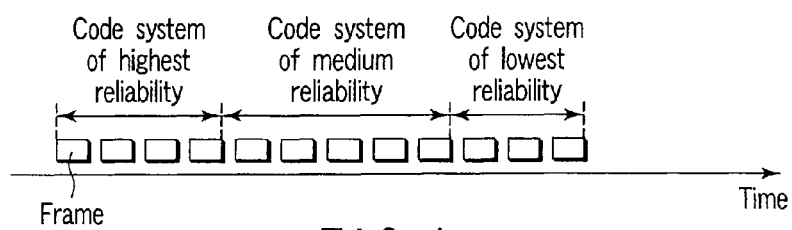
FIG. 4 is a conceptual diagram of a frame transmission in a communication method according to a modification of the first embodiment.

FIG. 4, which is a conceptual diagram of frames transmitted by a communication method according to a modification of the first embodiment, illustrates successively transmitted frames in the order in which they are sent. As shown, in this modification, a coding system of higher reliability is applied to frames which are transmitted earlier in a burst transmission and vice versa. With this modification, the highest-reliability coding system is applied to the leading frames in a burst transmission, thus reducing the number of times the leading frames are retransmitted in real time applications. As the result, problems little arise in playback of real-time contents.

Second Embodiment

Figure 5:
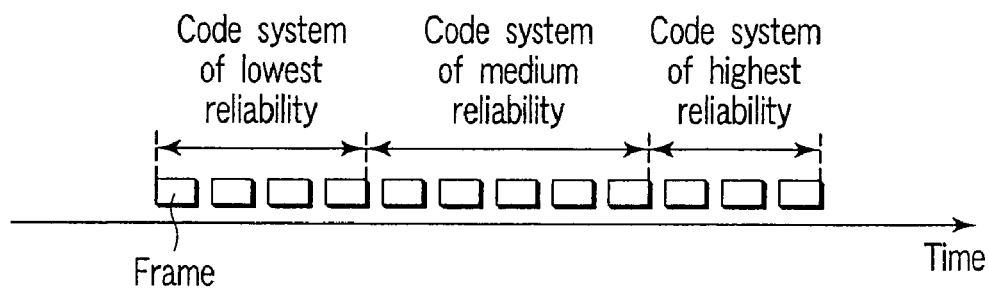
FIG. 5 is a conceptual diagram of a frame transmission in a communication method according to a second embodiment of the present invention.

Next, a communication method according to a second embodiment of the present invention will be described. In this embodiment, the order in which coding systems are applied to frames according to their reliability is made opposite to that in the aforementioned modification of the first embodiment. FIG. 5, which is a conceptual diagram of frames transmitted by the communication method of the second embodiment, illustrates frames in the order in which they are transmitted.

As shown, in this embodiment, a coding system of lower reliability is applied to frames which are transmitted earlier and vice versa.

With this embodiment, the highest-reliability coding system is applied to the trailing frames in burst transmission. Thus, an advantage that communication channels can be utilized in an efficient manner is obtained in a system that provides burst transmission in which frames are transmitted constantly and successively. That is, when frames are transmitted constantly and successively for a long period of time, it often becomes difficult to establish synchronization at the receiver. As a result, errors are more liable to occur in the trailing frames. In the second embodiment, however, since the highest-reliability coding system is applied to the trailing frames, it becomes possible to reduce the possibility of occurrence of errors in the trailing frames and consequently retransmission of them. As a result, communication channels can be utilized in an efficient manner.

Third Embodiment

A communication method and system according to a third embodiment of the present invention will be described next. According to this communication method, a transmitter selectively applies error detecting code systems to part of multiple frames or packets and transmits the multiple frames or packets in succession. A receiver receives the transmitted frames or packets, analyzes each of the frames or packets for whether an error detecting code system has been applied to it, decodes frames or packets to which the error detecting code systems have been applied, and returns an acknowledgment based on the results of decoding.

That is, in the third embodiment, in the communication method in which the transmitter burst transmits multiple frames and the receiver returns a block acknowledgment after receipt of the frames, no error correcting code system is applied to some of the frames to be burst transmitted. In other words, frames to which an error correcting code system has been applied and frames to which no error correcting code system is applied are present in a group of frames which are to be acknowledged collectively.

Figure 6:
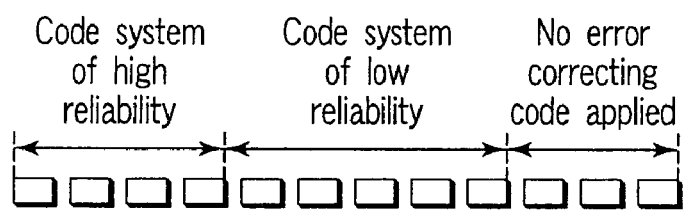
FIG. 6 is a conceptual diagram of a frame transmission in a communication method according to a third embodiment of the present invention.

FIG. 6 is a conceptual diagram of frames transmitted in accordance with the communication method of this embodiment and illustrates frames in the order in which they are sent. As shown, as in the first embodiment shown in FIG. 4, a coding system of higher reliability is applied to frames which are transmitted earlier. No error correcting code system is applied to the trailing frames.

Thereby, the decoding of frames to which error coding systems have been applied can be completed while the trailing frames are being received. As a result, the results of decoding can be reflected in an acknowledgment BA.

Figure 7:
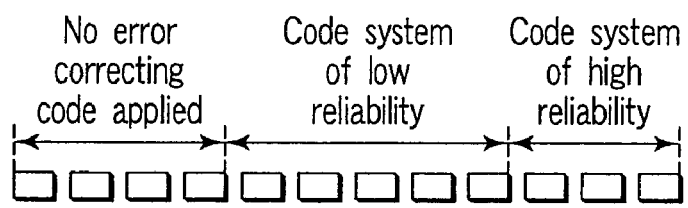
FIG. 7 is a conceptual diagram of a frame transmission in a communication method according to a modification of the third embodiment.

In addition, with a communication system (e.g., a wireless communication system) in which errors are more liable to occur in the trailing frames in a burst transmission, such a method as shown in FIG. 7 may be used. FIG. 7, which is a conceptual diagram of frames transmitted in the communication method according to this embodiment, illustrates the frames in the order in which they are sent. As shown, a coding system of higher reliability may be applied to frames which are transmitted later and no coding system may be applied to frames which are transmitted earliest. Thereby, error correcting codes can be applied only to frames in a burst transmission in which errors are liable to occur, allowing communication channels to be utilized in an efficient manner.

Fourth Embodiment

A communication method and system according to a fourth embodiment of the present invention will be described next. In this embodiment, frames the decoding of which could not be completed by the time to return acknowledgment in the first to third embodiments are retransmitted with an error correcting code system different from the one used in the previous burst transmission.

In this embodiment, in retransmission of frames or packets which have not been acknowledged, an error correcting code system is applied to them which is higher in reliability than the one applied to them in the first transmission.

Figure 8:
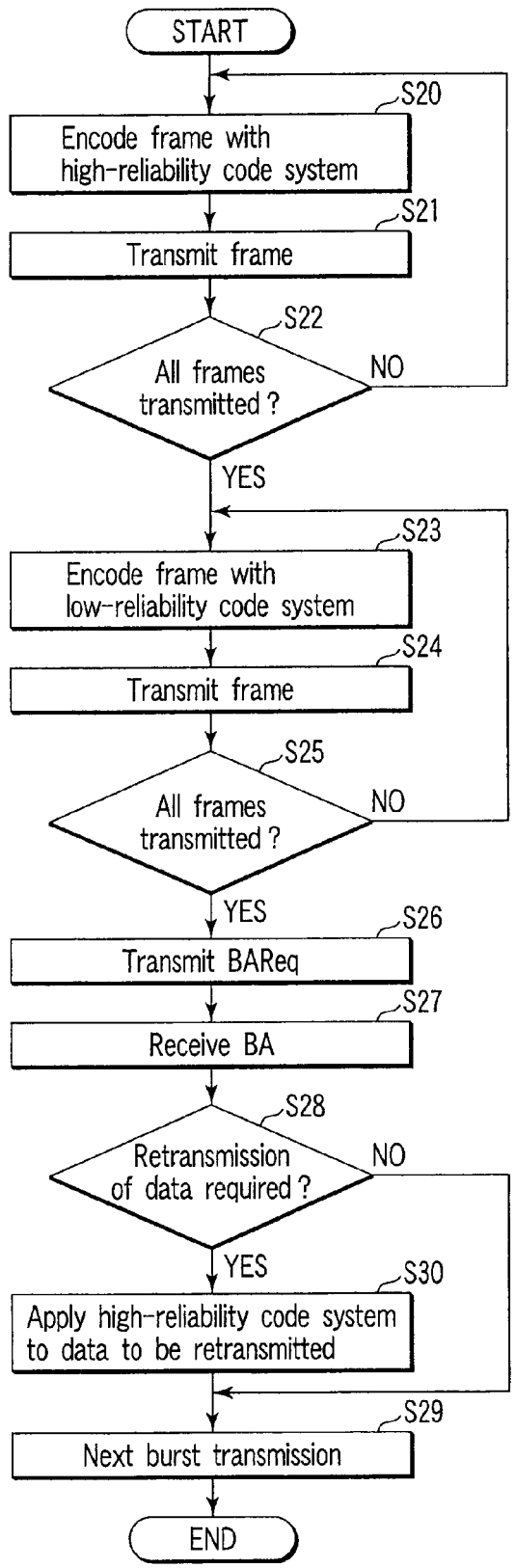
FIG. 8 is a flowchart illustrating a communication method according to a fourth embodiment of the present invention.

FIG. 8 is a flowchart illustrating the processing by the transmitter 2 in accordance with the communication method of this embodiment. The transmitter 2 first codes a frame in accordance with a high-reliability coding system (step S20) and then sends the frame to the receiver 3 (step S21). Steps S20 and S21 are repeated for all the frames to which the high-reliability coding system is to be applied (YES in step S22).

Next, frames to be sent after step S22 are coded using a low-reliability coding system (step S23) and then sent to the receiver 3 (step S24). Steps S23 and S24 are repeated for all the frames to which the low-reliability coding system is to be applied (YES in step S25).

Upon completion of transmission of all the frames, the transmitter 2 sends a acknowledge request frame BAReq to the receiver (step S26). Upon receipt of the ACK frame BA, the transmitter 2 determines whether there is need of retransmission of some data (step S28). If there is no need (NO in step S28), then the transmitter makes the next burst transmission of frames (step S29). If there is need (YES in step S28), the transmitter determines to apply a higher-reliability coding system to a frame to be retransmitted (step S30) and then makes the next burst transmission including the frame to be retransmitted (step S29).

The above processing will be described with reference to FIG. 9, which is a conceptual diagram of frames transmitted in accordance with the communication method of this embodiment and illustrates the frames in the order in which they were sent.

As shown, in the event that a frame to which a coding system other than the highest-reliability coding system has been applied in the first burst transmission has not arrived or has arrived with a unrecoverable error, that frame is retransmitted in the second burst transmission with a coding system higher in reliability than the coding system used in the first transmission. Thereby, it becomes possible to reduce the possibility of failure in retransmission of a frame once failed in transmission.

Figure 9:
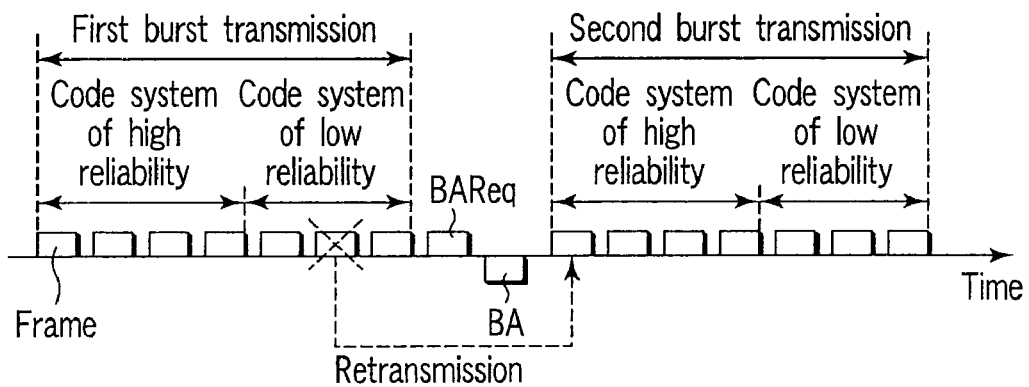
FIG. 9 is a conceptual diagram of a frame transmission in the communication method of the fourth embodiment.

In the example of FIG. 9, the retransmission frame is sent at the start of the second burst transmission; however, this is not restrictive. With this system, the order of transmission frames will be displaced temporarily.

Modification of Fourth Embodiment

Figure 10:
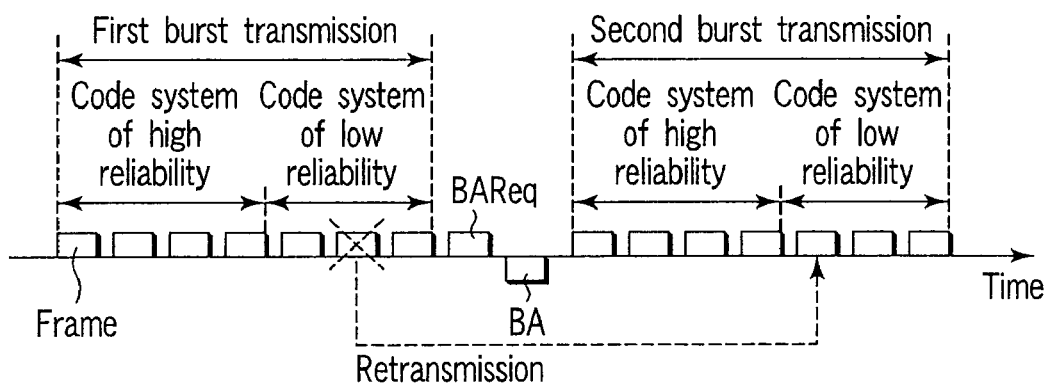
FIG. 10 is a conceptual diagram of a frame transmission in a communication method according to a modification of the fourth embodiment.

In contrast to the fourth embodiment, it is also possible to apply the same coding system as at the first transmission time to a retransmission frame as shown in FIG. 10. In this case, in step S30 in the flowchart shown in FIG. 8, the transmitter 2 determines to apply the same coding system as at the first transmission time to a frame which needs to be retransmitted.

In FIG. 10, the retransmission frame is sent at the start of frames to which the same coding system is applied; however, this is not restrictive. This method allows reuse of transmit data.

Fifth Embodiment

Next, a communication method and system according to a fifth embodiment of the present invention will be described. This embodiment is configured such that, in the first to fifth embodiments, two or more coding systems are applied to each frame and the receiving end selects one of the coding systems for decoding. The coding in the transmitting end is relatively simple but it takes long to transmit frames and the frequency band broadens.

Figure 11:
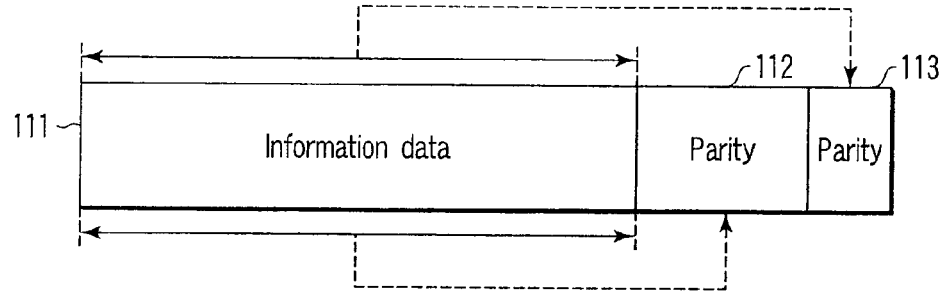
FIG. 11 shows the format of a frame transmitted in a communication method according to a fifth embodiment of the present invention.
Figure 12:
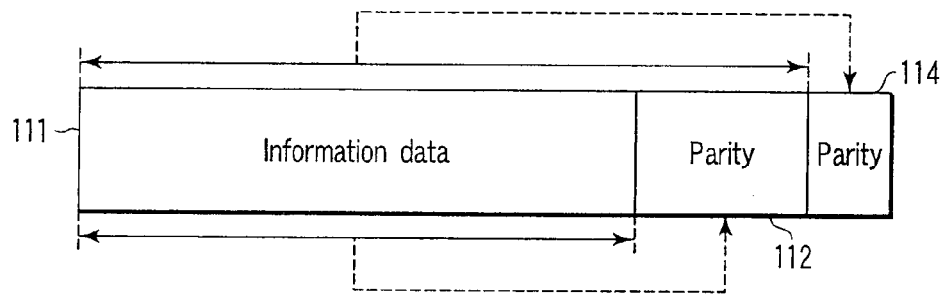
FIG. 12 shows the format of a frame transmitted in the communication method according to the fifth embodiment of the present invention.

FIGS. 11 and 12 each illustrate the format of an error correction coded frame according to this embodiment. In FIGS. 11 and 12, two different coding systems are applied to one frame.

First, as shown in FIG. 11, the frame comprises an information data field 111 and parity fields 112 and 113. As described previously, the information data is net data given by a user. The parity 112 is generated by an error correcting code system on the basis of the information data 111. The parity 113 is generated by an error correcting code system different from the one for the parity 112 on the basis of the information data 111.

Next, as shown in FIG. 12, the frame comprises an information data field 111 and parity fields 112 and 114. The parity 112 is generated by an error correcting code system on the basis of the information data 111. The parity 114 is generated by another error correcting code system on the basis of the information data 111 and the parity 112.

The parity may be placed at any location in the frame. The parity may be divided into parts and placed at different locations. Information data may be present which is coded only by some coding system. Furthermore, information data to which no coding system is applied may be present.

Figure 13:
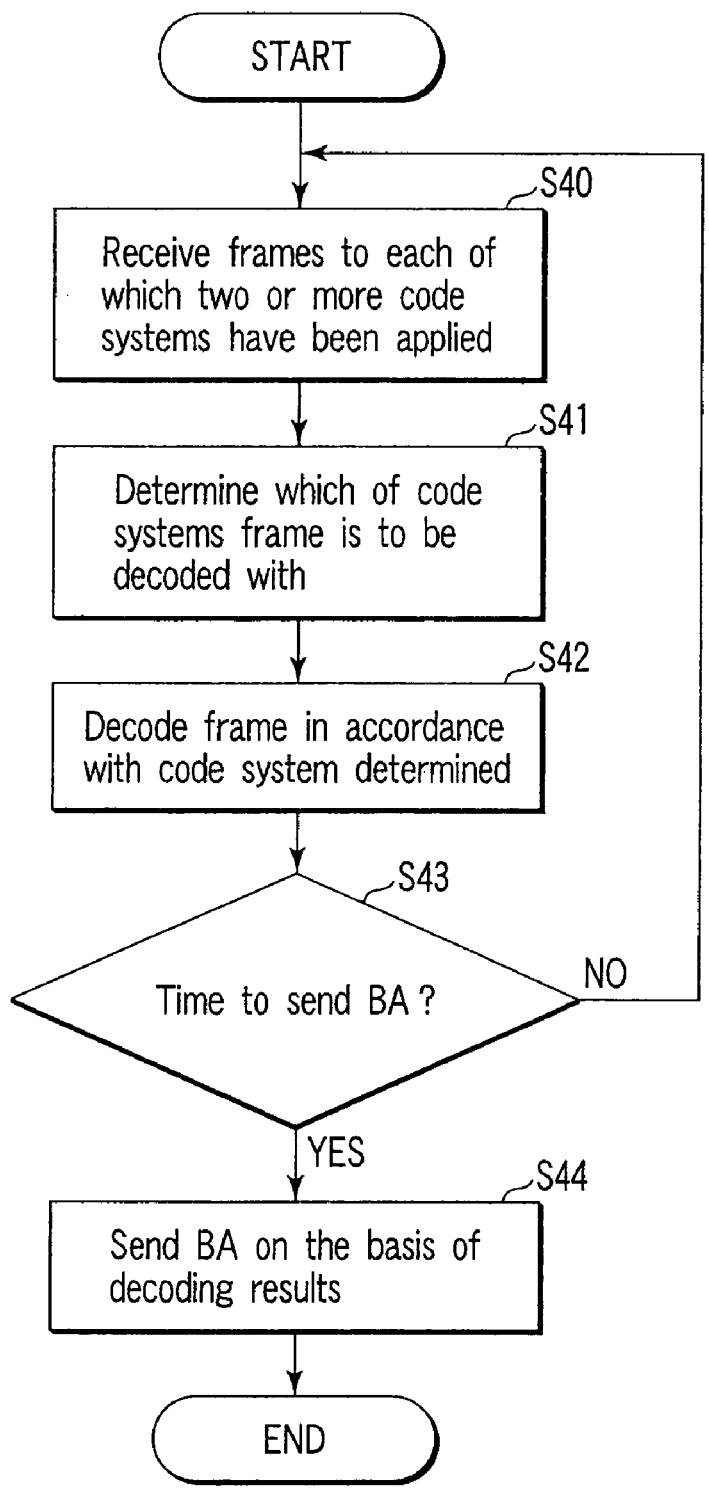
FIG. 13 is a flowchart illustrating the communication method of the fifth embodiment.

The processing of the receiver 3 in the communication method of this embodiment will be described next with reference to FIG. 13, which is a flowchart illustrating the processing of the receiver. As shown, first, the receiver 3 receives a frame to which two or more coding systems have been applied (step S40). Then, the receiver 3 determines which coding system to be decoded (step S41) and then decodes it in accordance with the coding systems determined in step S41 (step S42). Upon arrival of the time to send a BA, in other words, at the termination of processing of all the frames, the receiver sends an ACK frame to the transmitter 2 on the basis of the decoding results (step S44).

The above processing will be described with reference to FIG. 14, which is a conceptual diagram of frames transmitted in accordance with the communication method of this embodiment and illustrates the frames in the order in which they were sent. As shown, for example, four frames 131 to 135 are transmitted in sequence and then an ACK request frame 135 is sent. First and second error correcting code systems are applied to each of the frames 131 to 135. Suppose here that the reliability of the first error correcting code system is superior to that of the second error correction code system.

Figure 14:
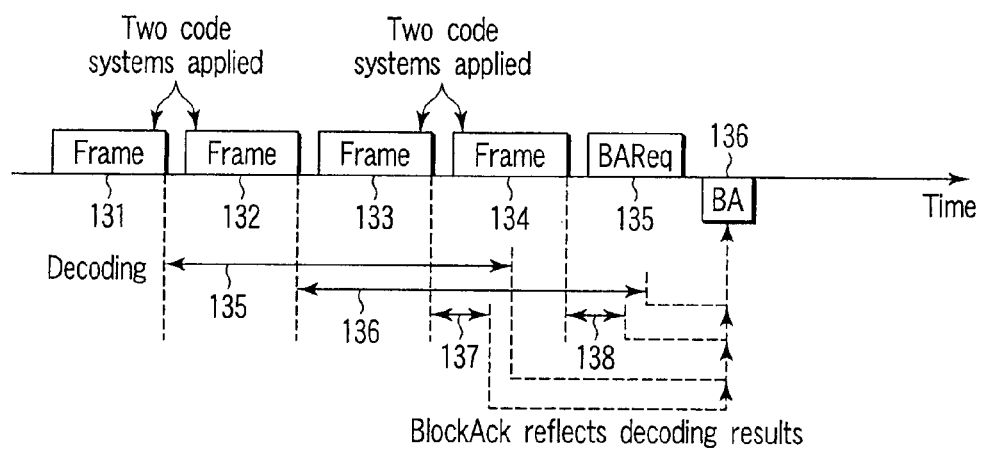
FIG. 14 is a conceptual diagram of a frame transmission in the communication method of the fifth embodiment.

The receiver performs decoding processes 135 and 136 for the first error correcting code on some leading frames (frames 131 and 132 in FIG. 14). Further, the receiver performs decoding processes 137 and 138 for the second error correcting code on some trailing frames (frames 133 and 134 in FIG. 14). The receiver then reflects the results of the decoding processes 135, 136, 137 and 138 in a BA frame.

The number of frames on which a decoding process is performed may be determined, as described previously, by preparing constants Mi (i=1, 2, . . . , n) corresponding to the first to n-th coding systems (n is a natural number of 2 or more). Alternatively, the number of frames to which a respective one of the coding systems is applied may be determined by using coefficients $\alpha 1$, $\alpha 2$, $\alpha 3$, . . . , and $\alpha n$ ($0<\alpha 1$, $\alpha 2$, $\alpha 3$, . . . , $\alpha n<1$) corresponding to the respective coding systems and determining integers Mi that satisfy Mi$\leq \alpha i \times N$ or $\alpha i \times N \leq$ Mi where N is the total number of frames in a burst transmission. Of course, any other method may be used.

Figure 15:
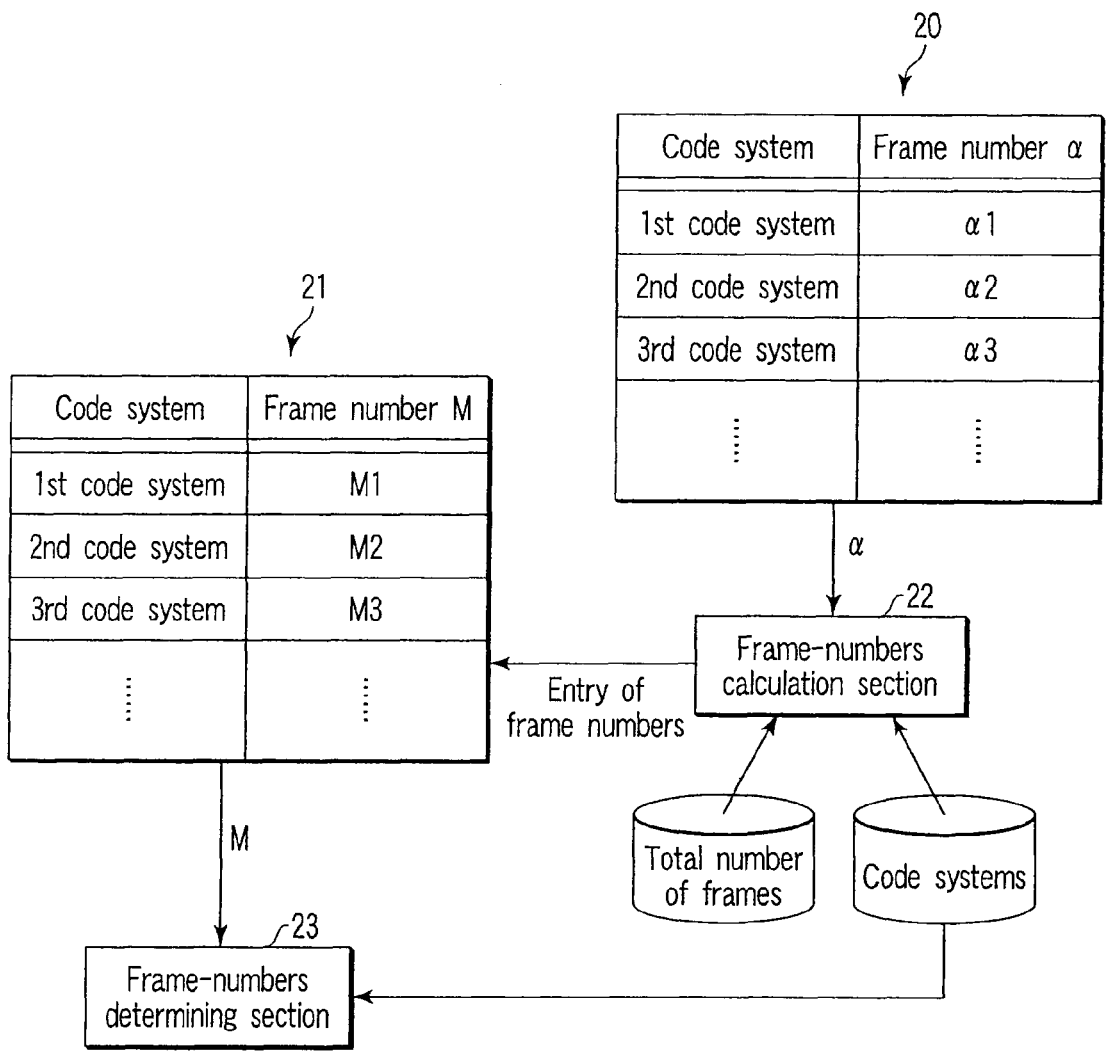
FIG. 15 is a block diagram of a receiver according to the fifth embodiment.

The method using the coefficients $\alpha i$ will be described with reference to FIG. 15, which is a block diagram of a portion of the baseband section 11 in the receiver 3. As shown, the baseband section 11 includes a coefficient table holding section 20, a frame-numbers table 21, a frame-numbers calculating section 22, and a frame-numbers determining section 23. The table 20 holds the coefficients $\alpha 1$ to $\alpha n$ for the first to n-th coding systems. The frame-numbers calculating section 22 calculates frame numbers Mi from the total number of frames, the coding systems, and the coefficients $\alpha i$. For example, when the first coding system is applied, the corresponding coefficient $\alpha 1$ is read from the table 20. Then, M1=($\alpha 1 \times N$) is calculated, which provides the number of frames to be decoded in accordance with the first coding system. The table 21 stores the number Mi of frames calculated in the frame-numbers calculating section 22 for each coding system. The frame-numbers determining section 23 reads the number of frames from the table 21 for each coding system. For example, for frames to which the first coding system has been applied, the frame number M1 is read from the table 21. Only the M1 number of frames is decoded in accordance with the first coding system.

With the method of this embodiment, even if the transmitting end does not know the decoding time required by the receiver, the receiver is allowed to complete the decoding process by the time to send an ACK frame. As a result, the results of decoding of all the frames according to the coding systems applied thereto can be reflected in the ACK frame BA.

The above-described fourth embodiment can be applied to this embodiment. In retransmitting a frame or packet for which no acknowledgment was received, that frame or packet is retransmitted in a frame position to which a higher-reliability error correction code is applied or in an earlier position of the frame positions to which the same coding system is applied.

Figure 16:
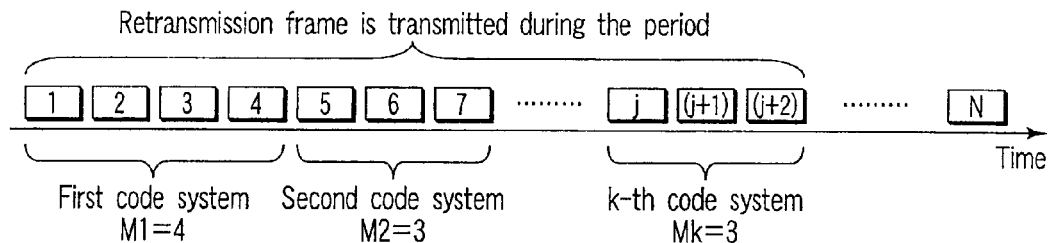
FIG. 16 is a conceptual diagram of a frame transmission in a communication method of the fifth embodiment.

The retransmission may be made in accordance with a method shown in FIG. 16. Assume here that the transmitter 2 knows the numbers of frames corresponding to individual coding systems. In this case, suppose that frames are transmitted in descending order of coding system reliability (the first coding system is the highest, followed by the second coding system, . . . , the k-th coding system) and the numbers of frames corresponding to the first, second, . . . , k-th coding systems are M1, M2, . . . , Mk, respectively. Then, the transmitter 2 may send a retransmission frame by the time when frames based on the k-th coding system have been sent, i.e., during transmission of the (M1+M2+ . . . +Mk) number of frames. This will offer the same advantages as with the fourth embodiment.

Sixth Embodiment

Next, a communication method and system according to a sixth embodiment of the present invention will be described.

This embodiment relates to an example of a method to determine the constants Mi in the fifth embodiment. In this embodiment, a number n (n≧1) of error correction code systems is prepared. Suppose that the maximum time required to decode one frame encoded in accordance with the i-th error correction code system is di (i=1, 2, . . . , n). Further, suppose that the interval from arrival of all frames encoded with the i-th error correction code system to the time to make acknowledgment is ti. For example, the maximum decoding time for one frame encoded with the first error correcting code system is d1 and the interval from arrival of all frames encoded with the first error correcting code system to the time to make acknowledgment is t1.

Figure 17:
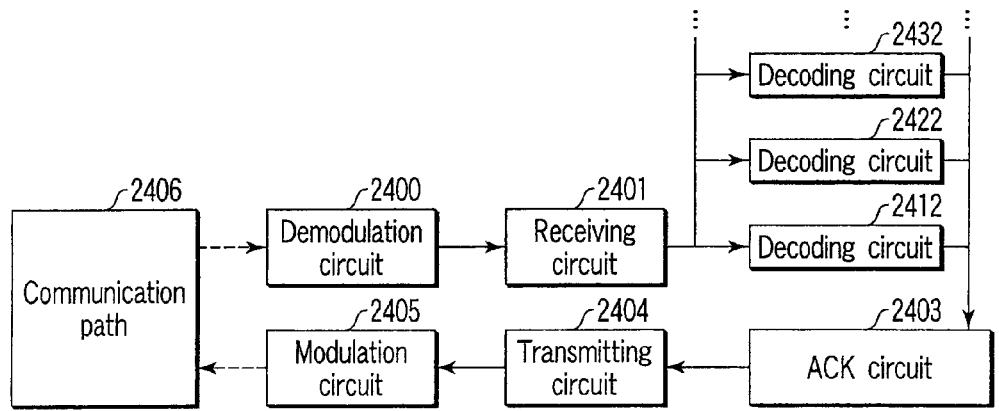
FIG. 17 is a block diagram of a receiver for use with a communication system according to a sixth embodiment of the present invention.

FIG. 17 is a block diagram of a receiver adapted for use with the communication system of this embodiment. As shown, the receiver includes a demodulation circuit 2400, a receiving circuit 2401, decode circuits 2412, 2422, 2432, . . . , an acknowledge circuit 2403, a transmission circuit 2404, and a modulation circuit 2405. FIG. 17 shows only circuits necessary for acknowledgment. When the receiver also has a function of transmitting data, a circuit for encoding transmit data is included.

The demodulation circuit 2400 is adapted to demodulate frames sent from the transmitter over a communication path 2406. The receiving circuit 2401 receives the demodulated frames from the demodulation circuit 2400. The decode circuits 2412, 2422, 2432, . . . are adapted to decode the received frames in accordance with the first to ith (i≦n) error correction code systems. The acknowledge circuit 2403 produces an ACK frame BA on the basis of the results of decoding by the decode circuits. The sending circuit 2404 outputs the ACK frame from the acknowledge circuit 2403 to the modulation circuit 2405, which in turn modulates the ACK frame and sends it over the communication path 2506.

With the configuration shown in FIG. 17, only one decode circuit is provided for each of the error correcting code systems. In this case, in decoding two or more frames in accordance with the same error correcting code system, each of these frames is decoded in sequence.

Figure 18:
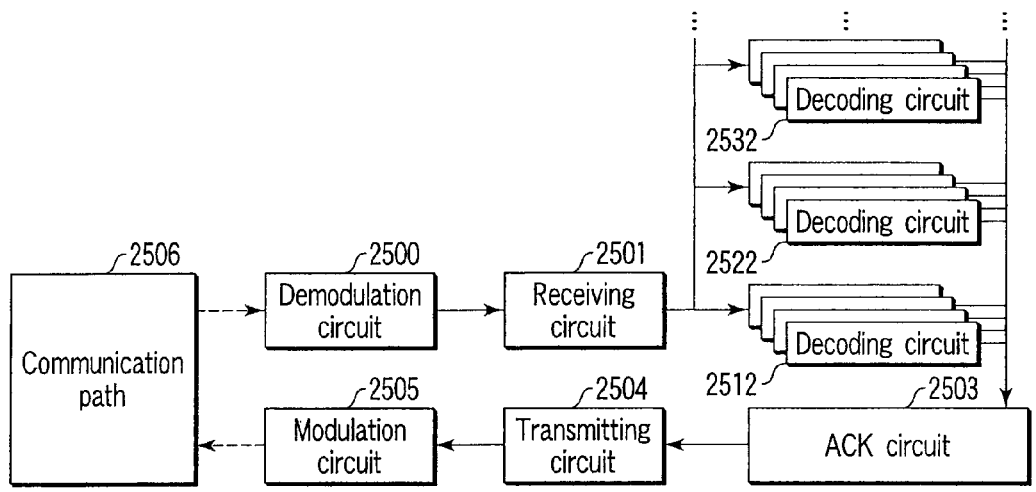
FIG. 18 is a block diagram of a receiver for use with the communication system of the sixth embodiment.

FIG. 18 is a block diagram of a receiver adapted for use with the communication system of this embodiment. As shown, the receiver includes a demodulation circuit 2500, a receiving circuit 2501, decode circuits 2512, 2522, 2532 . . . , an acknowledge circuit 2503, a transmission circuit 2504, and a modulation circuit 2505. FIG. 18 also shows only circuits necessary for acknowledgment.

The arrangement of FIG. 18 differs from that of FIG. 17 in that two or more decode circuits are provided for each of the error correcting code systems. Instead of the plurality of the decode circuits, a decode circuit which decodes a plurality of the frames simultaneously may be used. In either arrangement, two or more frames can be decoded concurrently.

Decode circuits adapted to concurrently decode two or more frames in accordance with an error correcting code system and decode circuits each adapted to sequentially decode frames in accordance with another error correcting code system may be used in combination. The decode circuits may be included in another circuit, for example, the receiving circuit.

Figure 19:
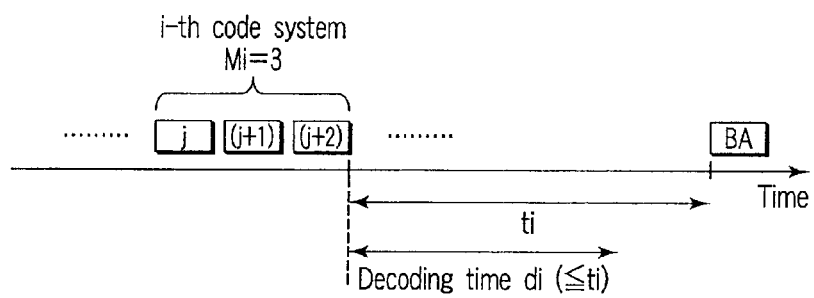
FIG. 19 is a conceptual diagram of a frame transmission in the communication method of the sixth embodiment.

For a code system for which decode circuit is provided to decode corresponding frames concurrently, the constants Mi can be determined so as to satisfy ti≧di for frames which are to be acknowledged on the basis of the results of decoding according to that code system. This is illustrated in FIG. 19. For example, assume that three frames (j, (j+1), (j+2)) are transmitted in accordance with the i-th code system. Suppose that the interval from the reception of the last frame (j+2) to the time to send an ACK frame is ti and the time required to decode the last frame is di. Then, the number, Mi, of frames for the ith code system can be determined so that the decoding time di of the last frame is shorter than the interval ti.

Figure 20:
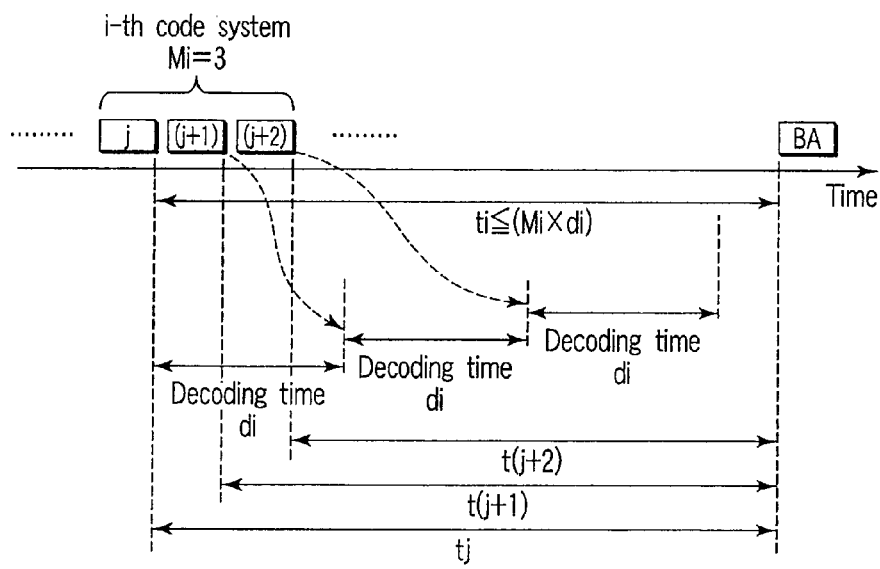
FIG. 20 is a conceptual diagram of a frame transmission in the communication method of the sixth embodiment.

For a code system for which decode circuit is provided which decodes corresponding frames one at a time and not concurrently, the following method can be used. Assume here that the number of frames encoded with that code system is Mi, the interval from reception of each of these frames to the time to send an ACK frame is tj, the interval from reception of the first of these frames to the time to send the ACK frame is ti, and the decoding time of each frame is di. Then, the constants Mi can be determined so as to satisfy tj≧di and di·Mi≦i for each frame. This is illustrated in FIG. 20. For example, suppose that three frames (j, (j+1), (j+2)) encoded with the i-th code system are transmitted. Also, suppose that the interval from reception of the first frame j to the time to send an ACK frame is ti and the time required to decode each frame is di. Then, decoding of the frame (j+1) is initiated after the termination of decoding of the frame j and decoding of the frame (j+2) is initiated after the termination of decoding of the frame (j+1). Thus, the number Mi of frames is determined so that the time required to decode three frames, di·Mi, is less than ti. With this method, it is desirable to determine the constant Mi so that the number of frames encoded with a high-reliability code system is as large as possible and the results of decoding of these frames are reflected in an ACK frame. Of course, any other method may be used to determine the constants Mi.

By determining the constants Mi in accordance with these methods, when the decoding times are known at the receiving end, frames can be decoded in time to send an ACK frame and the results of decoding of frames encoded with the highest-reliability code system can be reflected in the ACK frame.

In FIGS. 17 and 18, the method of this embodiment is implemented in hardware; however, it may be implemented in software provided that the same functions can be performed.

Seventh Embodiment

Figure 21:
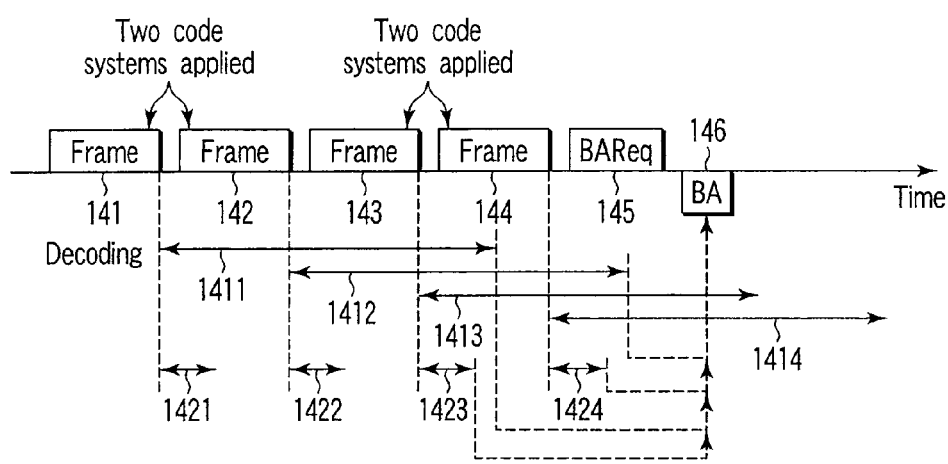
FIG. 21 is a conceptual diagram of a frame transmission in a communication method according to a seventh embodiment of the present invention.

Next, a communication method and system according to a seventh embodiment of the present invention will be described. This embodiment is configured such that, in the fifth or sixth embodiment, an ACK frame is produced using only the decoding results for frames which will have been decoded by the time to send that ACK frame. FIG. 21 is a conceptual diagram of frames transmitted in accordance with the communication method of this embodiment and illustrates the frames in the order in which they were sent.

As shown, four frames 141 to 144 are transmitted in sequence in a burst transmission and then a block acknowledge request frame BAReq is transmitted. In this case, the transmitter applies first and second error correcting code systems to each of the frames 141 to 144. The receiver decodes each of the frames 141 to 144 in accordance with both the first and second error correcting code systems. That is, upon receipt of the frame 141, the receiver performs a decoding process 1411 for the first error correcting code system and a decoding process 1421 for the second error correcting code system on it. Upon receipt of the frame 142, the receiver performs a decoding process 1412 for the first error correcting code system and a decoding process 1422 for the second error correcting coding system on it. Upon receipt of the frame 143, the receiver performs a decoding process 1413 for the first error correcting code system and a decoding process 1423 for the second error correcting code system on it. Finally, upon receiving the frame 144, the receiver performs a decoding process 1414 for the first error correcting code system and a decoding process 1424 for the second error correcting code system on it.

Assume here that the decoding processes 1413 and 1414 were not completed by the time to send an ACK frame. Then, the receiver produces an ACK frame BA on the basis of the results of the decoding processes 1411, 1412, 1421 to 1424 which have been completed by the time to send the ACK frame. When the decoding processes have been completed for both the first and second code systems, the results of decoding for the higher-reliability code system are adopted. In the example of FIG. 21, for the frames 141 and 142, the results of the decoding processes 1411 and 1412 for the first error correcting code system are adopted.

Figure 22:
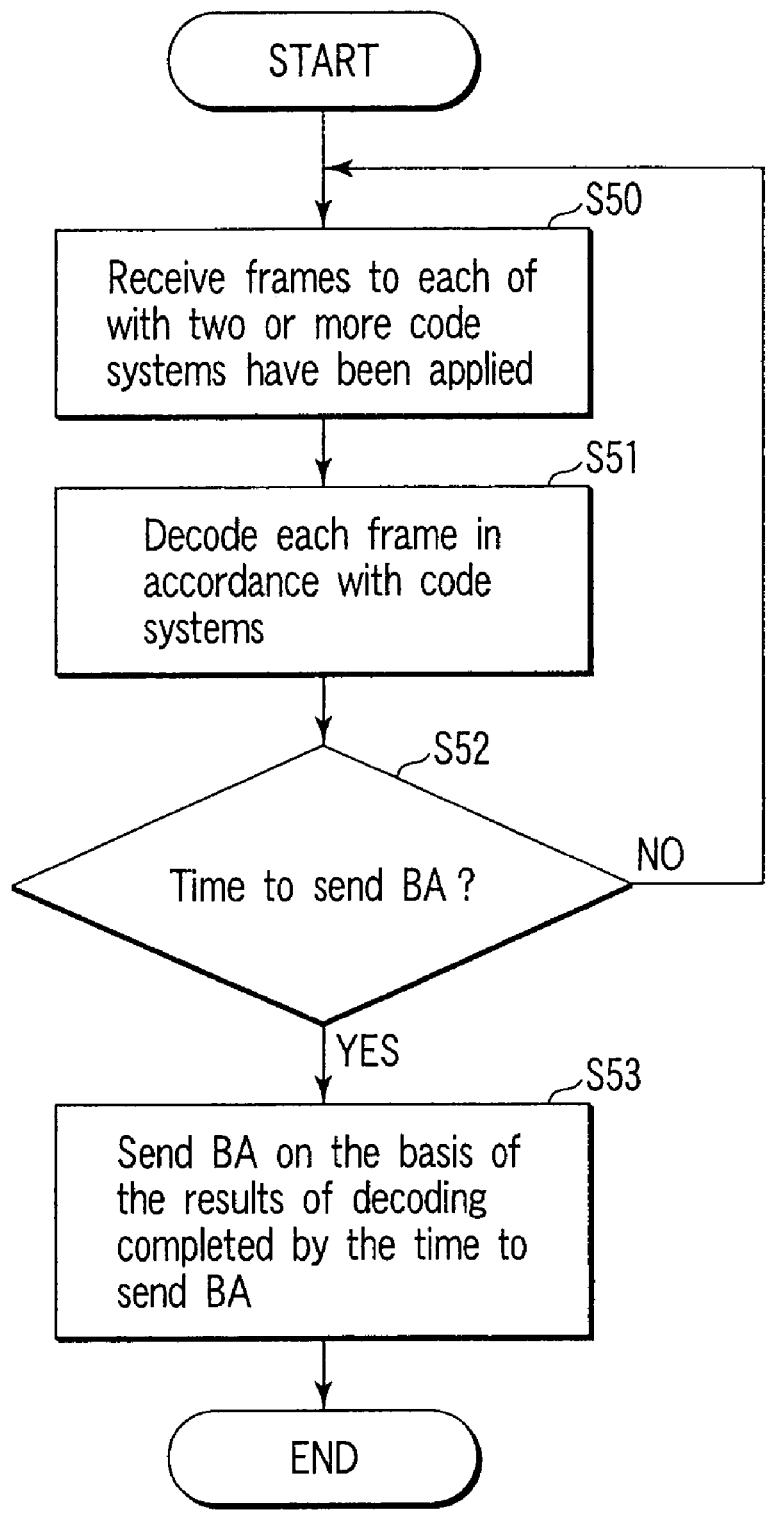
FIG. 22 is a flowchart illustrating the communication method of the seventh embodiment.

FIG. 22 is a flowchart illustrating the above processing. This processing is performed in the receiver 3. As shown, the receiver first receives frames to each of which two or more code systems have been applied (step S50). Then, the receiver decodes each of the frames for each of the code systems (step S51). Next, upon arrival of the time to send an ACK frame (YES in step S52), the receiver 3 sends an ACK frame produced on the basis of the results of decoding processes which have been completed by that time (step S53).

As described above, with the method of this embodiment, decoding is performed for each of the error correcting code systems applied to each frame. An ACK frame is produced on the basis of the results of decoding processes which have been completed by the time to send the ACK frame. In this case, when decoding processes for the error correcting code systems have been completed, the results of decoding for the highest-reliability code system are used.

Thus, even if the transmitter has no knowledge of the decoding times in the receiver, some decoding processes for two or more error correction code systems can be completed by the time to acknowledge and the results of decoding for the highest-reliability error correction code system can be reflected in a block ACK frame BA. The same holds for even the case where the transmitter knows the times required to perform decoding processes in the receiver and each decoding time varies every time.

Depending on code systems or decoding methods, the decoding time may vary according to the number of errors in a received frame or the position of an error or errors. In this case as well, the results of decoding processes for high-reliability code system which have been completed are simply reflected in an ACK frame.

Eighth Embodiment

Next, a communication system according to an eighth embodiment of the present invention will be described. This embodiment relates to a transmitter adapted to implement the communication methods according to the first through seventh embodiments. The receiver has such an arrangement as shown in FIG. 17 or 18.

Figure 23:
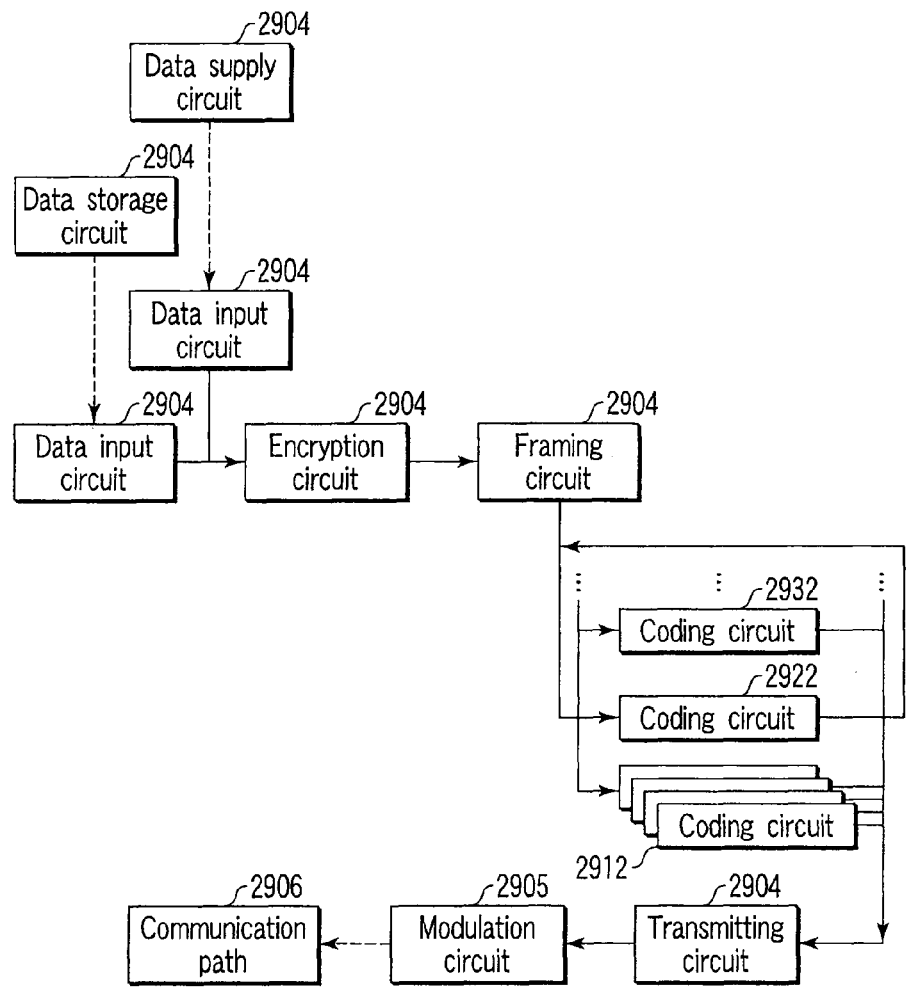
FIG. 23 is a block diagram of a transmitter for use with a communication system according to an eighth embodiment of the present invention.

FIG. 23 is a block diagram of a portion of the transmitter 2 adapted to apply coding in the above embodiments. In FIG. 23, a data supply circuit 2907 or a data storage circuit 2908, which may be a hard disk, a PC (personal computer), a mobile phone, etc., is connected to the interface section 6 shown in FIG. 1. In FIG. 23, each of the data supply circuit and the data storage circuit is connected to a corresponding data input circuit; however, the transmitter may have a single data input circuit or two or more data input circuits.

The data input circuits 2901 and 2902 receive data from the data supply circuit 2907 and the data storage circuit 2908. Each data input circuit is, for example, a PCI interface or an AV interface and corresponds to the interface section 6 in FIG. 1. Input data from the data input circuit is formed into a frame by a framing circuit 2909. There is a limit to the length of one frame. If, therefore, input data is long and does not fit into one frame, an operation such as of division is performed. The framing circuit 2909 need not necessarily to be provided. A frame may be formed after encryption by an encryption circuit 2903 or coding by coding circuits to be described later.

Next, two or mode code systems are applied to frames by coding circuits 2912, 2922, and 2932. Two or more coding circuits, as indicated at 2912, may be used to apply the same code system to multiple frames concurrently. One coding circuit may be used for one code system as indicated at 2922 and 2932. It is also possible to configure one coding circuit to apply two or more code systems. The encryption circuit 2903 provides WEP encryption which conforms to the wireless communication standard 802.11 or encryption which conforms to the 802.11i standard. The framing circuit 2909, portions of the respective coding circuits 2912, 2922 and 2932, and a portion of a transmission circuit 2904 correspond to the MAC section 9 in FIG. 1. The circuits of the respective coding circuits 2912, 2922 and 2932 which are contained in the MAC section 9 produce and decode an FCS (Frame Check Sequence) that conforms to the 802.11 standard, for example.

Figure 24:
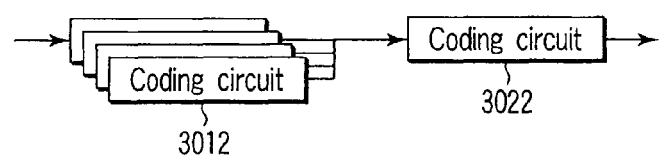
FIG. 24 is a block diagram of a portion of a transmitter for use with the communication system of the eighth embodiment.

As shown in FIG. 23, the transmitter is configured to allow the output of each of the coding circuits to be input again to any of the coding circuits. This configuration allows the code systems to be applied in any order and several times. When the order in which the code systems are applied is fixed, the order of the coding circuits may be fixed as shown in FIG. 24. After these processes have been terminated, frames are sent over a communication path 2906 through a transmission circuit 2904 and a modulation circuit 2905. Each of the above circuits may be implemented either in hardware or in software. A portion of the transmission circuit 2904 and the modulation circuit 2905 correspond to the physical section 8 and the RF section 4 in FIG. 1.

Ninth Embodiment

Next, a communication method and system according to a ninth embodiment of the present invention will be described. This embodiment is directed to a modification of the frame formats of the fifth embodiment shown in FIGS. 11 and 12.

Figure 25:
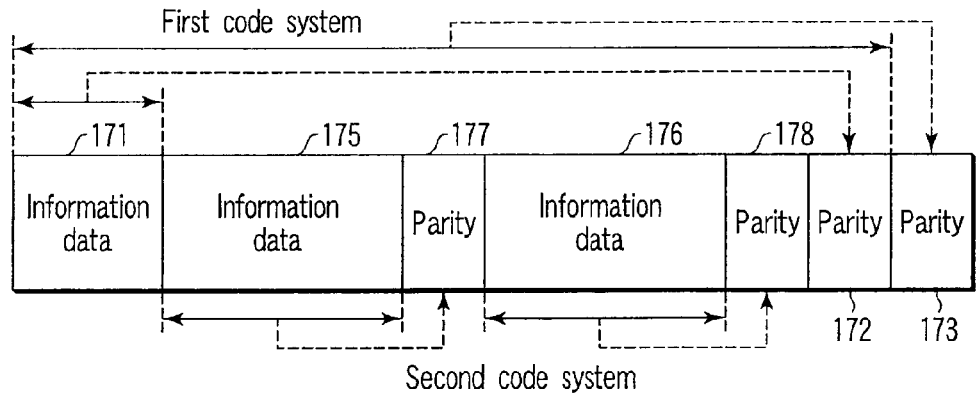
FIG. 25 shows the format of a frame transmitted in a communication method according to a ninth embodiment of the present invention.

FIG. 25 shows the frame format of the ninth embodiment. The frame includes information data 171, 175 and 176 and parity fields 172, 173, 177, and 178. The parity fields 177 and 178 are respectively produced by encoding the information data 175 and 176 in accordance with the second code system. The parity field 172 is obtained by encoding the information data 171 in accordance with the first code system. The parity 173 is produced by applying the first code system to the information data 171, 175 and 176 and the parity fields 172, 177 and 178 which are taken as an information data.

Thus, the same code system may be applied two or more times in a frame. Alternatively, a frame may contain a portion which is not encoded. A code system may be further applied to a portion containing a parity field already produced.

For example, the wireless LAN standard IEEE 802.11 specifies the application of a CRC error correcting code called frame check sequence (FCS). For example, with the parity 173 as FCS parity and the information field 171 as MAC header, the CRC parity 172 of the MAC header is produced. Further, there is a method to divide the frame into information fields 175 and 176 and apply another code system to the information fields to produce parity fields 177 and 178. This code system may be an error correcting code, such as an RS code or an LDPC code, or any other code. The frame may be divided into more than two or may not be divided.

Figure 26:
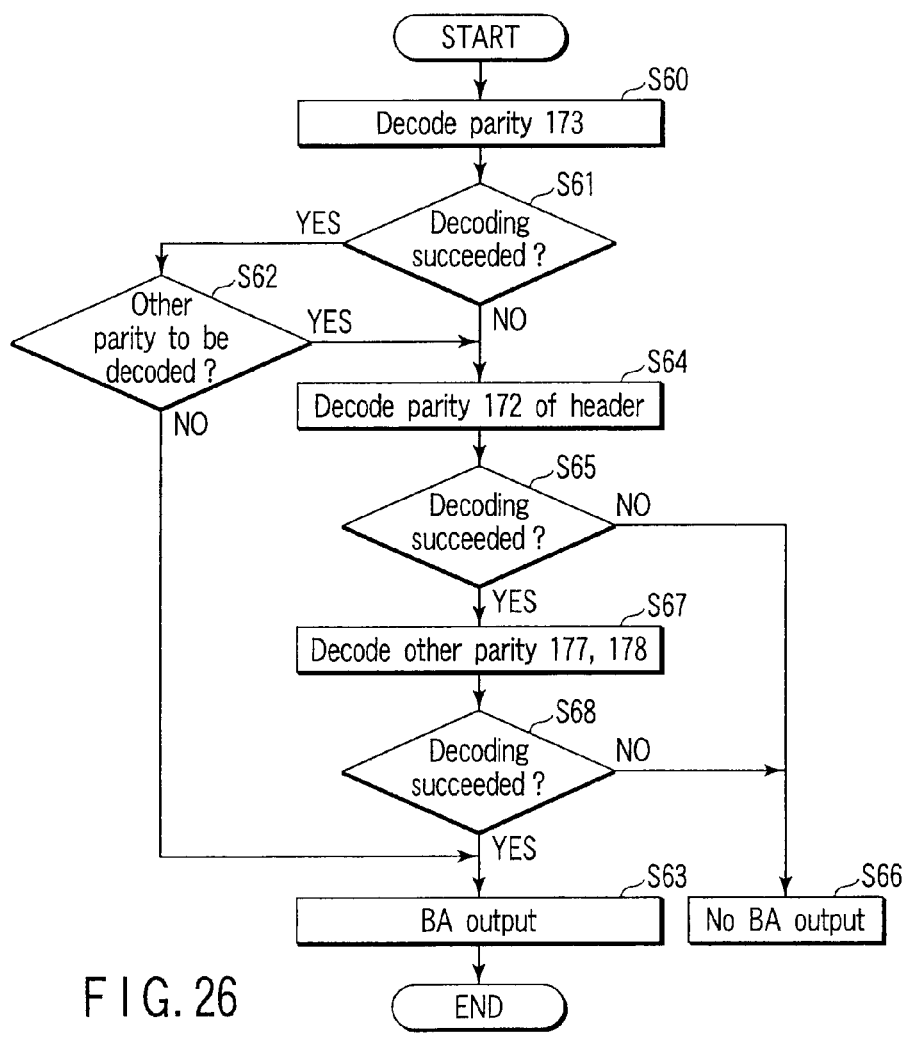
FIG. 26 is a flowchart illustrating the communication method of the ninth embodiment.

The operation of the receiver 3 when such a frame as described above is used will be described with reference to a flowchart shown in FIG. 26.

As shown, the receiver 3 decodes the parity 173 produced using the first code system (step S60). If decoding has succeeded (step S61), there is much possibility of success in decoding the other parity fields 172, 177 and 178 and hence decoding of these parity fields may be omitted (NO in step S62). When decoding is omitted, an ACK frame is sent on the basis of the result of decoding in step S60 (step S63). If decoding has failed in step S60 (NO in step S61), or if decoding is performed on the other parity (YES in step S62), the next parity 172 is decoded (step S64). If decoding has failed in step S64, no acknowledgment is made (step S66) because the information field 171 will not be recovered even if decoding of the remaining parity fields 177 and 178 have succeeded.

If the decoding of parity 172 has succeeded (YES in step S65), the parity fields 177 and 178 are decoded (step S67) and acknowledgment is then made on the basis of the results of these decoding processes (step S63).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication method comprising:
receiving multiple frames by a receiver, a plurality of code systems being applied to respective of the multiple frames by a transmitter; and
executing, by the receiver, an acknowledgement process using a result of a decoding process for one of the plurality of code systems which has been completed before a time at which an acknowledgement signal is to be transmitted,
wherein the plurality of code systems include a first code system with a lower-reliability and a second code system with a higher-reliability,
a time required for a decoding process for the first code system is shorter than an interval between a time when receiving a last frame of the multiple frames and a time when the acknowledgement process is started, and
a maximum time required for a decoding process for the plurality of code systems is shorter than an interval between a time when receiving a first frame of the multiple frames and the time when the acknowledgement process is started.

2. The method according to claim 1, wherein when decoding processes for two or more code systems have been completed before the time at which the acknowledgement signal is to be transmitted, the acknowledgement process is executed using a result of a decoding process for a highest-reliability code system.

3. The method according to claim 1, wherein one of the code systems is a cyclic redundancy check (CRC).

4. The method according to claim 1, wherein one of the code systems is an Reed-Solomon (RS) or a Low Density Parity Check (LDPC).

* * * * *